United States Patent
Kawamura et al.

(10) Patent No.: US 6,381,655 B1
(45) Date of Patent: Apr. 30, 2002

(54) SYSTEM FOR TRANSMITTING INFORMATION ABOUT AN ELECTRONIC UNIT STORED IN A STORAGE MEANS HAVING A HIERARCHICAL DATA STRUCTURE TO ONE OF A PLURALITY OF ELECTRONIC UNITS

(75) Inventors: Harumi Kawamura, Tokyo (JP); Harold Aaron Ludtke, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/499,053

(22) Filed: Feb. 4, 2000

Related U.S. Application Data

(62) Division of application No. 09/054,183, filed on Apr. 2, 1998, now Pat. No. 6,055,589.

(30) Foreign Application Priority Data

Apr. 15, 1997 (JP) ............................................... 9-096874

(51) Int. Cl.[7] .............................................. G06F 13/14
(52) U.S. Cl. .............................. 710/5; 710/62; 710/72; 710/74; 711/4; 711/114; 711/202
(58) Field of Search ................ 710/5, 62, 72, 710/74; 711/4, 114, 202

(56) References Cited

U.S. PATENT DOCUMENTS

| | | | |
|---|---|---|---|
| 4,829,421 A | 5/1989 | Ritchie | |
| 5,237,693 A * | 8/1993 | Kiyohara et al. | 395/725 |
| 5,638,535 A | 6/1997 | Rosenthal et al. | 711/165 |
| 5,644,766 A * | 7/1997 | Coy et al. | 395/600 |
| 5,696,991 A | 12/1997 | Chang | 710/52 |
| 5,737,736 A * | 4/1998 | Chang | 707/102 |
| 5,751,969 A | 5/1998 | Kapoor | 709/235 |
| 5,805,930 A | 9/1998 | Rosenthal et al. | 710/57 |
| 5,829,053 A * | 10/1998 | Smith et al. | 711/202 |
| 5,860,079 A * | 1/1999 | Smith et al. | 711/4 |
| 5,996,030 A * | 11/1999 | Ofer | 710/19 |
| 6,049,840 A * | 4/2000 | Shibuya et al. | 710/5 |

FOREIGN PATENT DOCUMENTS

| | | | |
|---|---|---|---|
| EP | 0 604 166 A | 6/1994 | |
| JP | 96/29654 * | 9/1996 | G06F/13/14 |

OTHER PUBLICATIONS

Kunzman A.J. et al.; 1394 High Performance Serial Bus: The Digital Interface for ATV, IEEE Transactions on Consumer Electronics, vol. 41, No. 3; Aug. 1, 1995, pp 893–900.

* cited by examiner

*Primary Examiner*—Thomas Lee
*Assistant Examiner*—Abdelmoniem Elamin
(74) *Attorney, Agent, or Firm*—Frommer Lawrence & Haug LLP; William S. Frommer; Gordon Kessler

(57) ABSTRACT

A method for transmitting information between each electronic unit, comprising the steps of (a) transmitting information whose amount does not exceed a predetermined data amount, (b) determining whether or not the predetermined data amount is larger than a desired information amount, (c) when the determined result at step (b) is No, transmitting remaining information for the predetermined amount or less, and (d) repeating the steps (a) to (c) until there is no remaining information.

10 Claims, 12 Drawing Sheets

14,15 : IEEE 1394 SERIAL BUS CABLES

Fig. 7

| | |
|---|---|
| opcode | DIRECT SELECT OBJECT |
| operand [0] | source_plug |
| operand [1] | subfunction |
| operand [2] | number_of_object_selection spesification (n) |
| operand [3] ⋮ | tuner_object_selection_specification [0] |
| ⋮ | ⋮ |
| ⋮ | tuner_object_selection_specification [n-1] |

Fig. 8

| | |
|---|---|
| opcode | DIRECT SELECT OBJECT |
| operand [0] | (FFh) |
| operand [1] | subfunction |
| operand [2] | (FFh) |

Fig. 9

| | |
|---|---|
| opcode | DIRECT SELECT OBJECT |
| operand [0] | source_plug |
| operand [1] | status |
| operand [2] | number_of_object_selection spesification (n) |
| operand [3]<br>⋮ | tuner object_selection_specification [0] |
| ⋮ | ⋮ |
| ⋮ | tuner_object_selection_specification [n-1] |

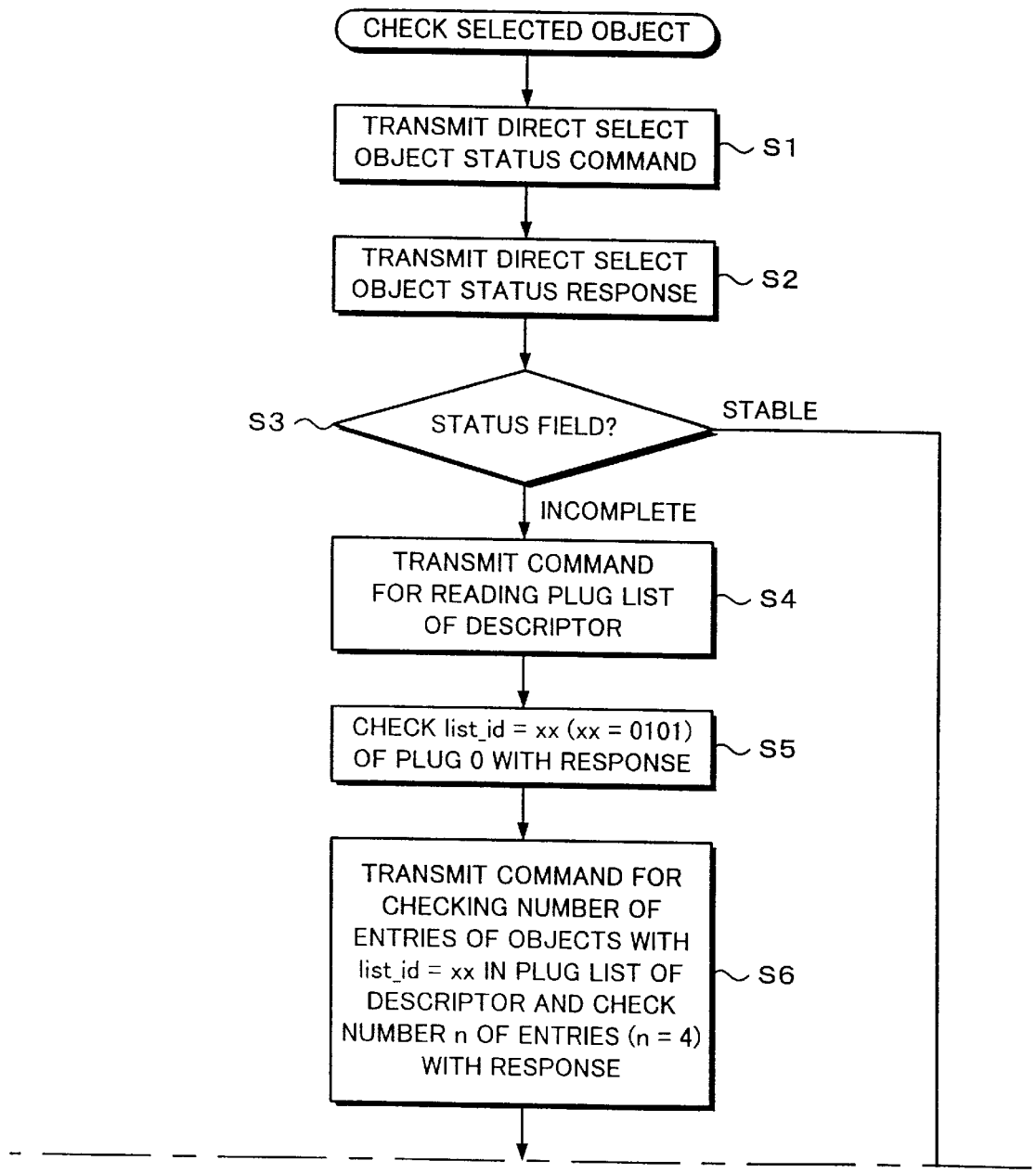

| opcode | DIRECT SELECT OBJECT |
|---|---|
| operand [0] | source_plug : plug 0 |
| operand [1] | status : stable |
| operand [2] | number_of_object_selection_specification : 4 |
| operand [3] | selection_specification [0] |
| ⋮ | ⋮ |
| operand [x] | selection_specification [3] |

Fig. 13

| opcode | DIRECT SELECT OBJECT |
|---|---|
| operand [0] | source_plug : plug 0 |
| operand [1] | status : incomplete |
| operand [2] | number_of_object_selection_specification : 3 |
| operand [3] | selection_specification [0]<br><br>selection_specification [1]<br><br>selection_specification [2] |

Fig. 14

| opcode | READ DESCRIPTOR | |
|---|---|---|
| operand [0] | } data_id | = xx |
| [1] | | |
| [2] | } sub_data_id | = kk |
| [3] | | |
| [4] | "FF" | |
| [5] | data_length | = 0 |
| [6] | } address | |
| [7] | | |

Fig. 15

| opcode | READ DESCRIPTOR | |
|---|---|---|
| operand [0] | } data_id | = xx |
| [1] | | |
| [2] | } sub_data_id | = k |
| [3] | | |
| [4] | read_result_status | = OK |
| [5] | data_length | = yy |
| [6] | } address | = 0000 |
| [7] | | |
| [8] | entry_length | = zz |
| | data | : ANTENNA |
| | data | : FREQUENCY |
| ⋮ | ⋮ | ⋮ |
| [n] | data | |

SYSTEM FOR TRANSMITTING INFORMATION ABOUT AN ELECTRONIC UNIT STORED IN A STORAGE MEANS HAVING A HIERARCHICAL DATA STRUCTURE TO ONE OF A PLURALITY OF ELECTRONIC UNITS

CROSS REFERENCE TO RELATED APPLICATIONS

This application is a Divisional of pending application Ser. No. 09/054,183, filed Apr. 2, 1998 now U.S. Pat. No. 6,055,589.

BACKGROUND OF THE INVENTION

1. Field of the Invention

The present invention relates to an electronic unit for use with for example an IEEE 1394 serial bus, in particular, to a technology for transmitting a large amount of data using an asynchronous packet.

2. Description of the Related Art

A communication system that connects electronic units (hereinafter referred to as units) such as a personal computer, a digital video cassette recorder (hereinafter referred to as DVCR), and a digital television receiver with an IEEE 1394 serial bus and that sends/receives packets of a digital video signal, a digital audio signal, and a control signal therebetween has been proposed.

FIG. 1 shows an example of such a communication system. The communication system comprises a monitor 11, a DVCR 12, and a tuner 13 as units. The monitor 11 and the DVCR 12 are connected with an IEEE 1394 serial bus cable 14. The monitor 11 and the tuber 13 are connected with an IEEE 1394 serial bus cable 15.

In the communication system, an isochronous communication (referred to as ISO communication) for periodically transmitting real time data such as a digital video signal and a digital audio signal between units and an ASYNCHRONOUS communication (ASYNC communication) for non-periodically transmitting such as a unit operation control command and a unit connection control command can be performed. For example, a digital video signal and a digital audio signal selected by the tuner 13 can be reproduced as video information and audio information by the monitor 11. Alternatively, such signals can be recorded by the DVCR 12. In addition, a channel selection control command of the tuner 13, an operation mode setup command of the DVCR 12, and so forth can be sent from the monitor 11 to the relevant units through the IEEE 1394 serial bus cables 14 and 15.

In the communication system shown in FIG. 1, there is an AV/C (Audio Visual/Control) command set as commands for controlling AV (Audio Visual) units. In the AV/C command set, a status command for inquiring a status has been defined. In addition, as a response to the status command, status information of a designated unit that is sent back as an operand has been defined.

The data amount of the state may be very large. For example, as shown in FIG. 2, a television broadcast has a hierarchical structure composed of a network layer, a multiplex layer, a service layer, and a component layer. Thus, the data amount of a status command for inquiring each service (broadcast channel) that the digital broadcast tuner is currently selecting may exceed 30 bytes. In the digital broadcast, a plurality of services can be placed on one stream. Thus, a response to an inquiry is required for a plurality of services. Consequently, the data amount of one response may become several hundred bytes.

On the other hand, since the sizes of a command register (buffer) and a response register (buffer) of an FCP (Function Control Protocol) of the IEEE 1394 serial bus are up to 512 bytes, a command packet and a response packet whose sizes exceed 512 bytes cannot be transmitted and received. In addition, it is not assured that a real unit have a buffer that can store data of 512 bytes (the data amounts of currently available buffers are in the range from several ten bytes to one hundred and several ten bytes). When the buffer size is limited, information corresponding to an inquired state cannot be obtained.

OBJECTS AND SUMMARY OF THE INVENTION

The present invention is made from the above-described point of view. An object of the present invention is to provide a unit that allows a large amount of data that exceeds the size of a buffer thereof to be obtained and an information transmitting method thereof.

The present invention is a method for transmitting information between each electronic unit, comprising the steps of (a) transmitting information whose amount does not exceed a predetermined data amount, (b) determining whether or not the predetermined data amount is larger than a desired information amount, (c) when the determined result at step (b) is No, transmitting remaining information for the predetermined amount or less, and (d) repeating the steps (a) to (c) until there is no remaining information.

The present invention is an electronic unit for communicating with a plurality of units, comprising first means for physically communicating with the plurality of units, buffer means for temporarily storing data that is transmitted by the first means; and controlling means for controlling the first means and the buffer means, wherein the controlling means transmits information whose amount does not exceed a predetermined data amount, determines whether or not the predetermined data amount is larger than a desired information amount, when the determined result is No, transmits remaining information for the predetermined amount or less, and repeats these operations until there is no remaining information.

The present invention is a storing medium storing a program for an electronic unit for communicating with a plurality of units, comprising first means for physically communicating with the plurality of units, buffer means for temporarily storing data that is transmitted by the first means, and controlling means for controlling the first means and the buffer means, the program causing the controlling means to perform the functions of (a) transmitting information whose amount does not exceed a predetermined data amount, (b) determining whether or not the predetermined data amount is larger than a desired information amount, (c) when the determined result at step (b) is No, transmitting remaining information for the predetermined amount or less, and (d) repeating the steps (a) to (c) until there is no remaining information.

The above, and other, objects, features and advantage of the present invention will become readily apparent from the following detailed description thereof which is to be read in connection with the accompanying drawings.

BRIEF DESCRIPTION OF THE DRAWINGS

FIG. 7 is a schematic diagram showing the structure of DIRECT SELECT OBJECT control command corresponding to a tuner sub-unit;

FIG. 8 is a schematic diagram showing the structure of DIRECT SELECT OBJECT status command;

FIG. 9 is a schematic diagram showing the structure of a response to the DIRECT SELECT OBJECT status command;

FIGS. 10A and 10B are flow charts showing a process for checking objects selected in the tuner sub-unit shown in FIG. 3

FIG. 13 is a schematic diagram showing an example of the structure of a response to the DIRECT SELECT OBJECT status command in the case that the capacity of the buffer is insufficient;

FIG. 14 is a schematic diagram showing an example of the structure of a descriptor read command; and FIG. 15 is a schematic diagram showing an example of the structure of the descriptor read command.

DETAILED DESCRIPTION OF THE PREFERRED EMBODIMENTS

Next, with reference to the accompanying drawings, an embodiment of the present invention will be described.

Figure 3:
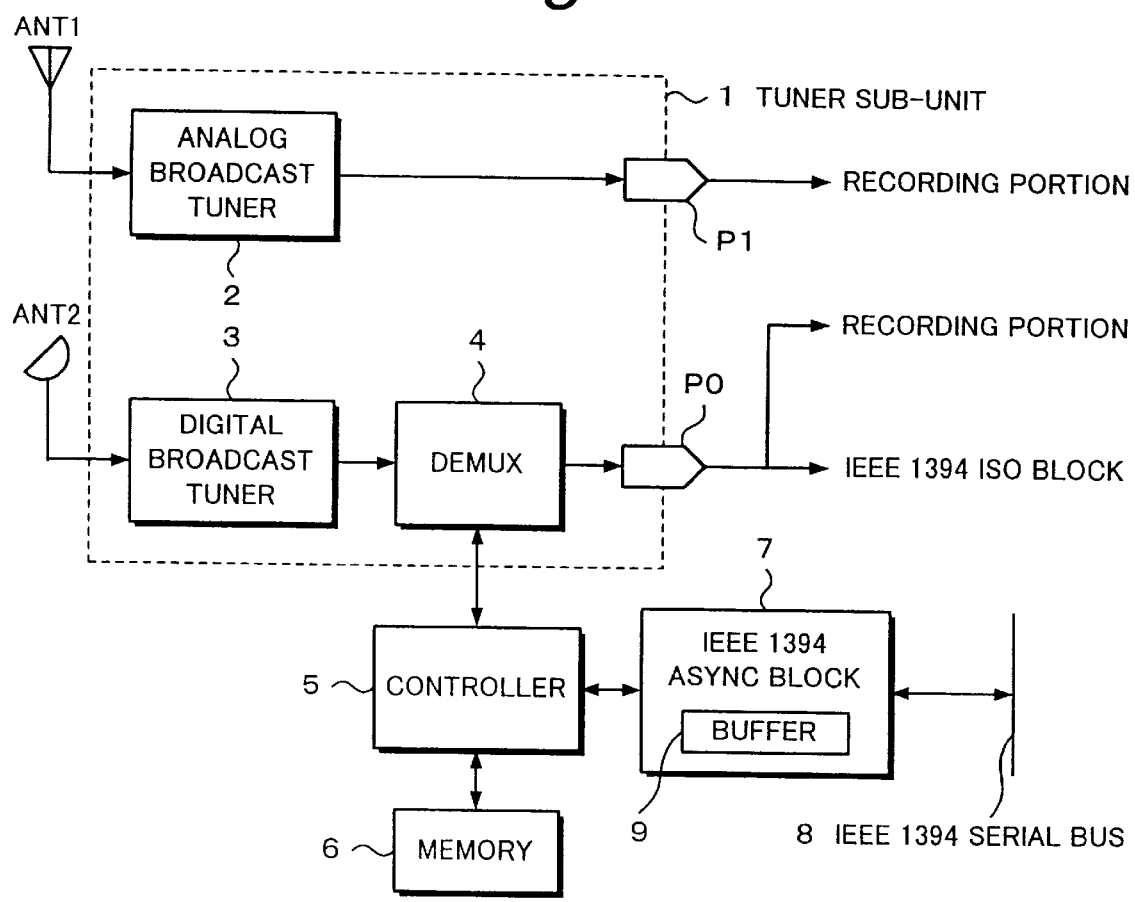
FIG. 3 is a block diagram showing the structure of principal portions of a DVCR according to the present invention.

FIG. 3 is a block diagram showing the structure of principal portions of a DVCR according to the present invention. The DVCR comprises a tuner sub-unit 1, a controller 5, a memory 6, and an IEEE 1394 ASYNC block 7.

The tuner sub-unit 1 has an analog broadcast tuner 2 and a digital broadcast tuner 3. The analog broadcast tuner 2 receive a television broadcast signal through an antenna (ANT) 1. The digital broadcast tuner 3 receives a television broadcast signal through an antenna (ANT) 2. A signal of a channel selected by the analog broadcast tuner 2 is sent to a recording portion (DVCR sub-unit) through a sub-unit output plug P1. A stream from a transponder selected by the digital broadcast tuner 3 is sent to a demultiplexer 4. The demultiplexer 4 selects at least one service and sends the selected service to a recording portion and an IEEE 1394 ISO block through a sub-unit output plug P0. The demultiplexer 4 branches service information of the stream to the controller 5. The sub-unit output plugs P0 and P1 are output terminals in the logical meaning and it is not required that they are physical output plugs.

The controller 5 controls the entire DVCR. In addition, the controller 5 creates an object list corresponding to service information received from the demultiplexer 4 and writes the object list to the memory 6. Moreover, the controller 5 sends/receives a command and response to/from another unit through the IEEE 1394 ASYNC block 7 and an IEEE 1394 serial bus 8. Furthermore, the controller 5 writes information of signals that are currently being output from the sub-unit output plugs P0 and P1 to the memory 6.

Figure 1:
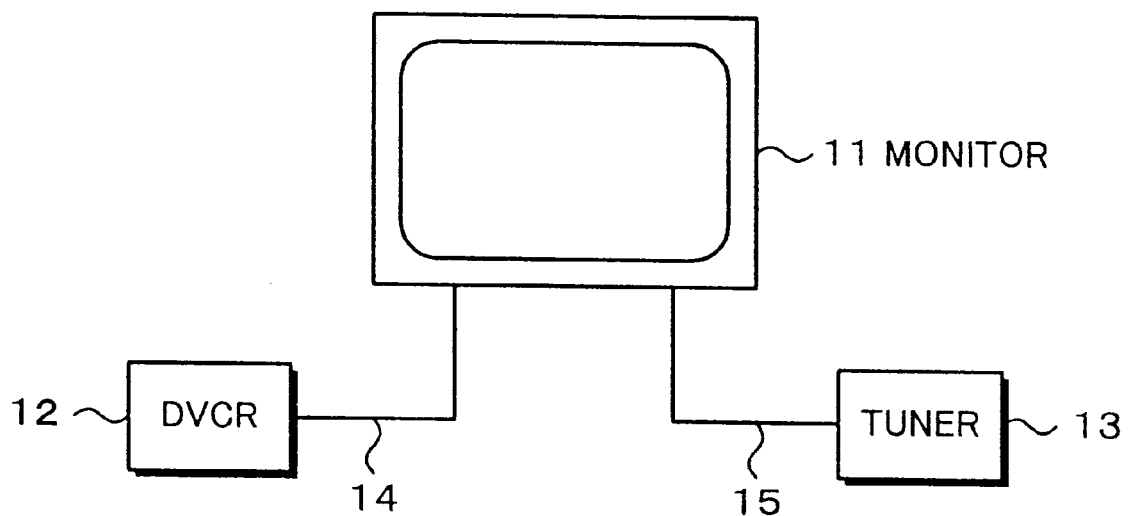
FIG. 1 is a schematic diagram showing the structure of a communication system using IEEE 1394 serial bus.
Figure 2:
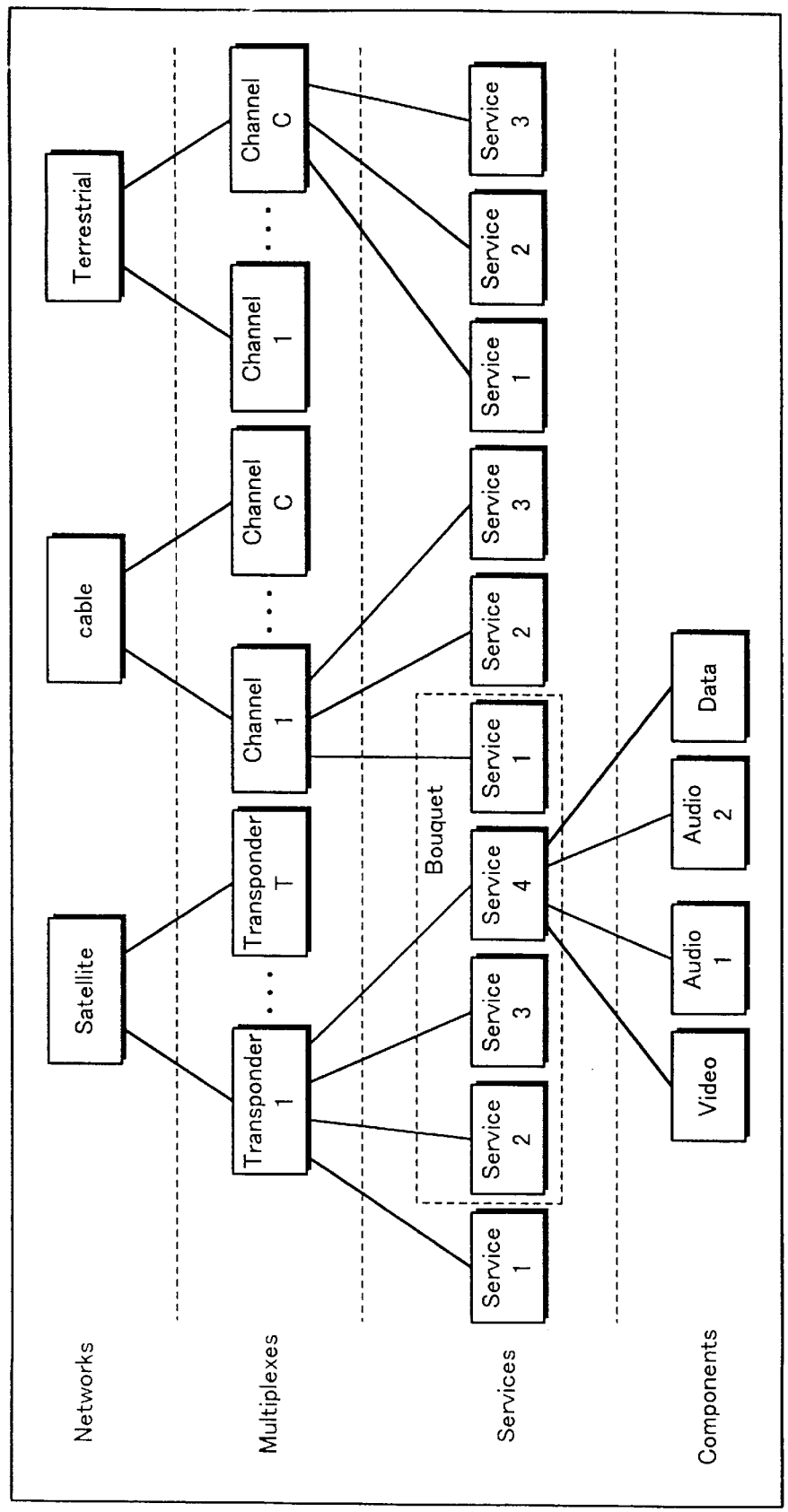
FIG. 2 is a schematic diagram showing a hierarchical structure of a television broadcast.
Figure 4:
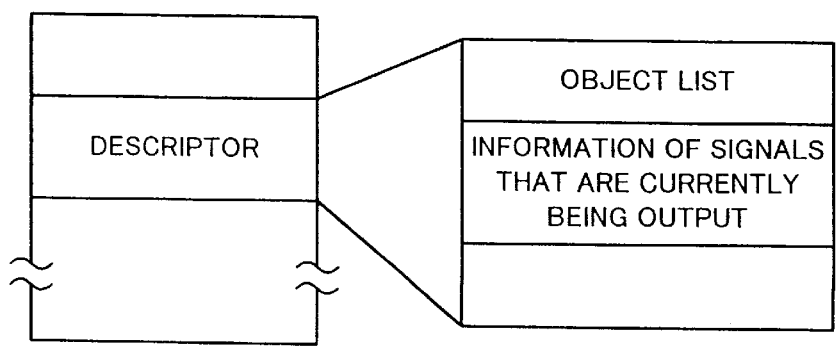
FIG. 4 is a schematic diagram showing the internal structure of a memory shown in FIG. 3.
Figure 5:
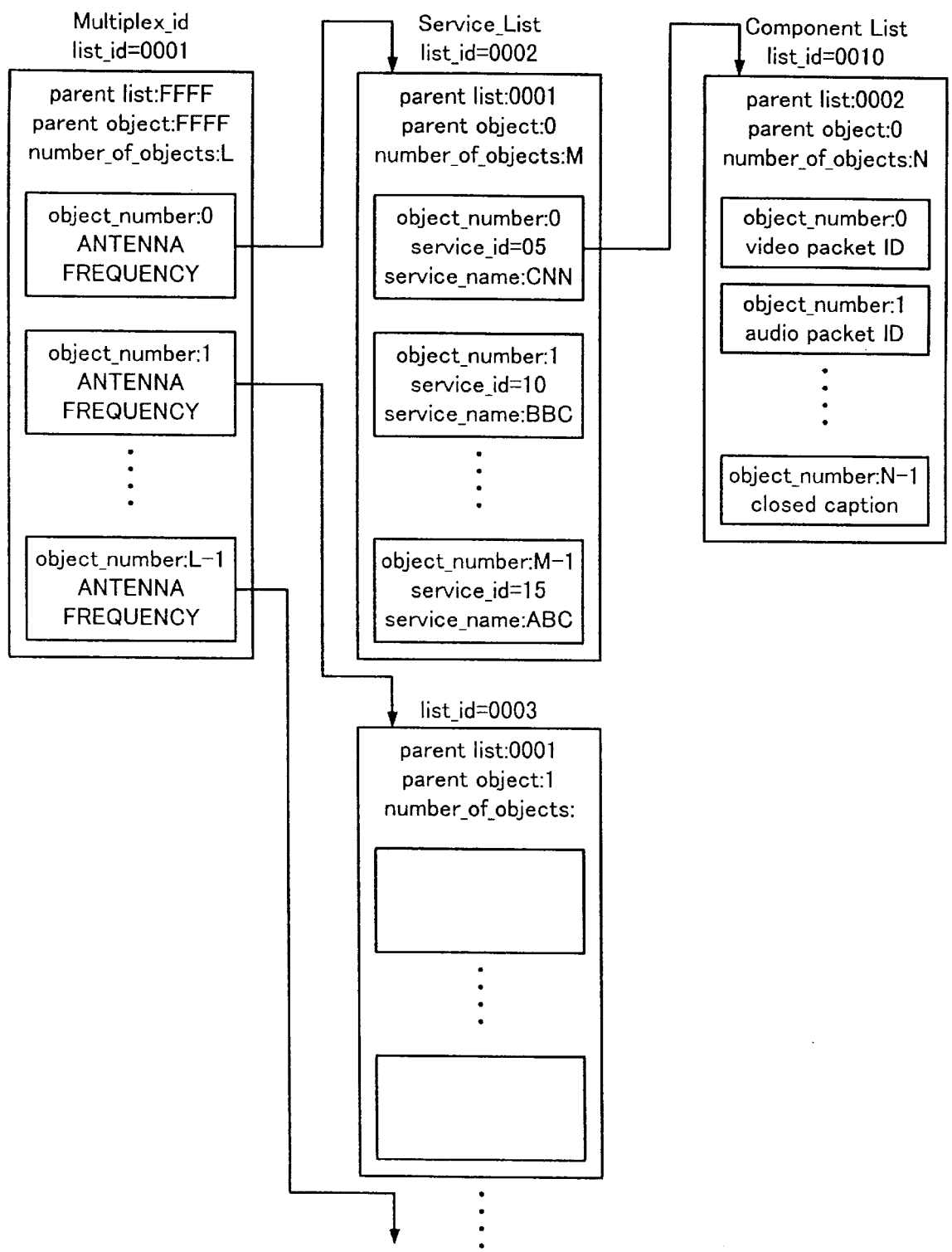
FIG. 5 is a schematic diagram showing an example of an object list stored in a descriptor.
Figure 6A:
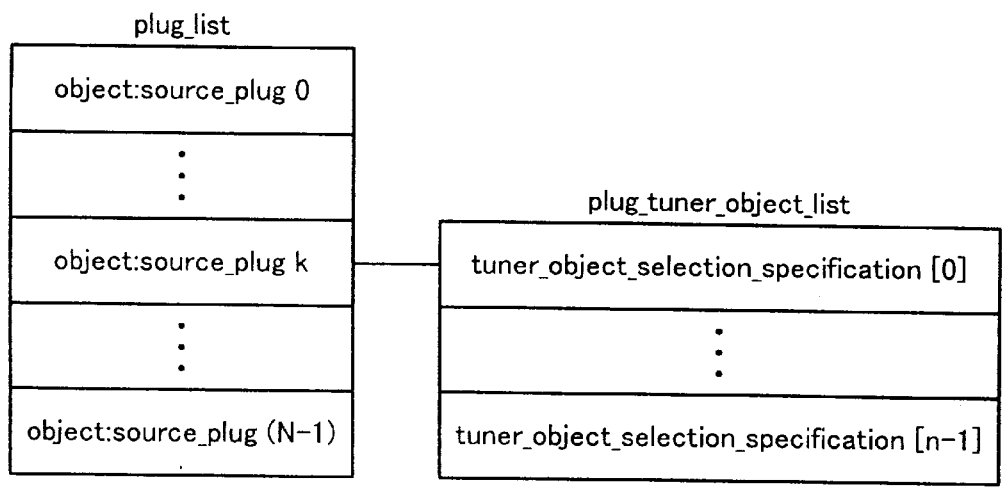
FIGS. 6A and 6B are schematic diagrams showing an example of information that represents current output signals stored in the descriptor.
Figure 6B:
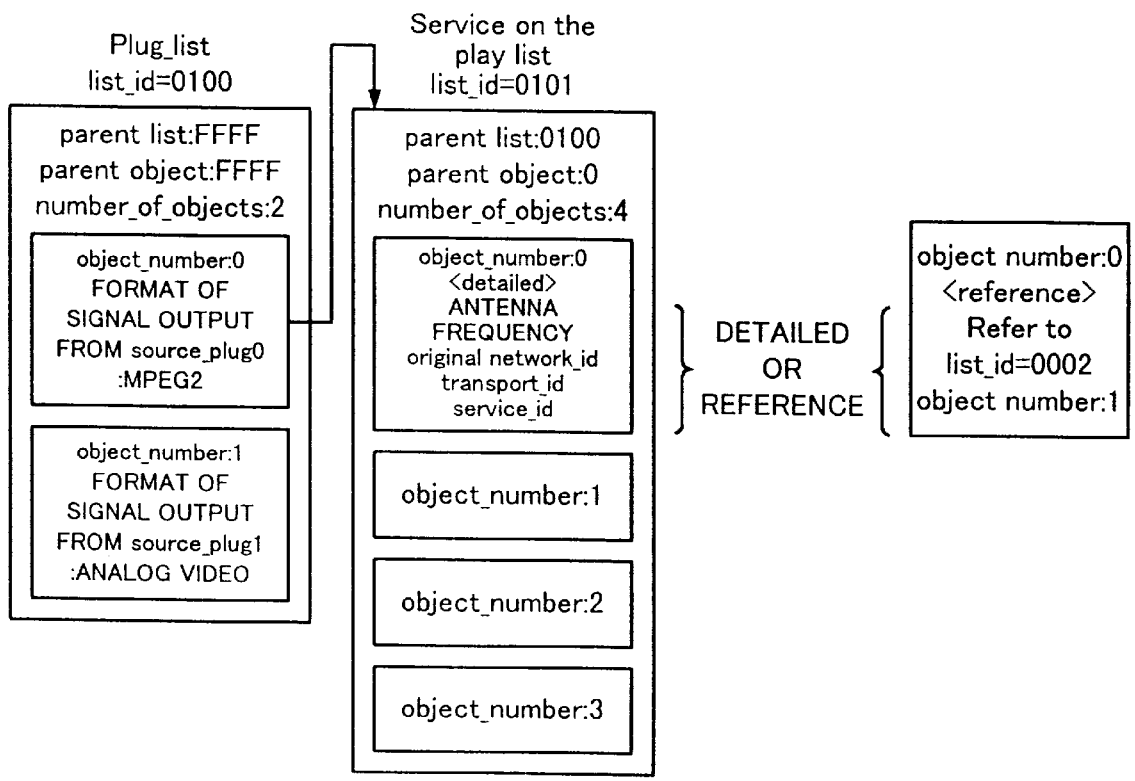

The memory 6 has a particular area referred to as a descriptor as shown in FIG. 4. In the descriptor, the above-mentioned object list and information of signals that are currently being output are written. FIG. 5 shows an example of the object list. The object list is created corresponding to the multiplex layer, the service layer, and the component layer shown in FIG. 1. FIG. 6A shows the structure of a list (plug list) that shows plugs of the tuner sub-unit and objects that are currently being output from these plugs. This list is referred to as plug tuner object list. FIG. 6B shows a real example of the plug tuner object list. As shown in FIG. 6B, there are two types of object entry describing method. The first method is a detailed type for describing specifications in detail. The second method is a reference type for referencing another list.

The IEEE 1394 ASYNC block 7 assembles a command and a response created by the IEEE 1394 ASYNC block 7 as an ASYNC packet and sends the ASYNC packet to the IEEE 1394 serial bus 8. In addition, the IEEE 1394 ASYNC block 7 disassembles an ASYNC packet received from the IEEE 1394 serial bus 8 into a command and a response and sends the command and the response to the controller 5. At this point, the command and the response are temporarily stored in the buffer memory (that has a transmission buffer and a reception buffer).

Next, a process for checking objects selected by the tuner sub-unit 1 shown in FIG. 3 will be described. First of all, the structure of a command and a response used in the process will be described.

Direct Select Object command as a tuner sub-unit command selects at least one service, multiplexed stream, or component that is being broadcast and outputs the selected service, multiplexed stream, or component to a designated sub-unit plug. A control command designates the selection. A status command inquires what is currently being selected.

FIG. 7 shows the structure of a control command. In FIG. 7, source_plug represents an output plug of the tuner sub-unit. subfunction removes, appends, or replaces a designated object of a designated plug.

tuner_object_selection_specification is a parameter necessary for selection. It is supposed that the amount of information of tuner_object_selection_specification is around 10 to 50 bytes. When a command transmitter unit designates a plurality of objects, even if the size of the buffer memory of the IEEE 1394 ASYNC block is not sufficient, the objects can be selected by dividing them into a plurality of responses with subfunction:append.

FIG. 8 shows Direct Select Object status command. The Direct Select Object status command inquires what is currently being output to a designated plug. FIG. 9 shows a response of the Direct Select Object status command.

Figure 10B:
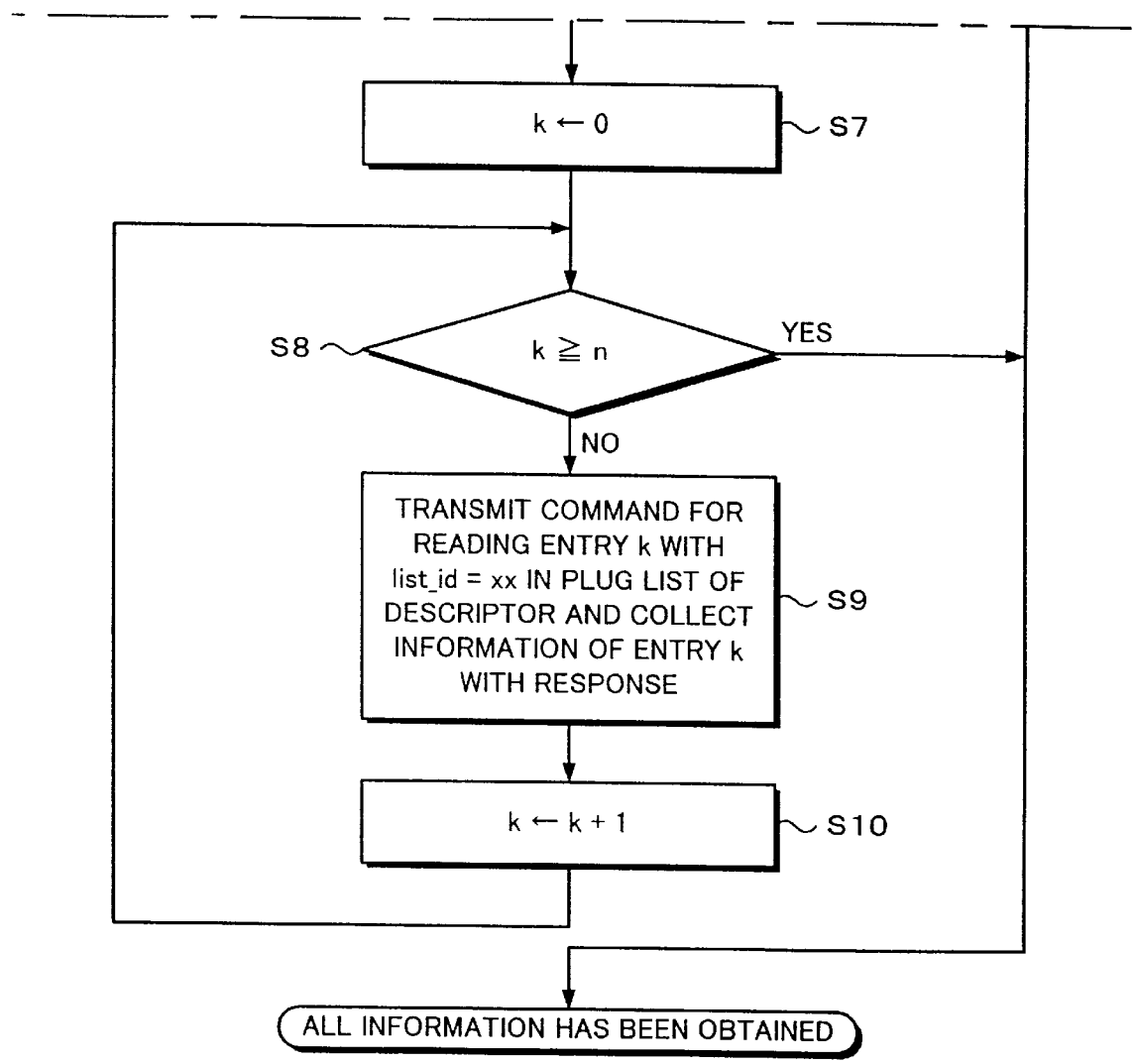

Next, with reference to a flow chart shown in FIGS. 10A and 10B, a process for checking objects selected by the tuner sub-unit 1 shown in FIG. 3 will be described.

At step S1, the Direct Select Object status command is transmitted. In other words, another unit (for example, the monitor unit) connected to the IEEE 1394 serial bus 8 shown in FIG. 3 places a command as shown in FIG. 8 in an ASYNC packet and sends the resultant ASYNC packet to the IEEE 1394 serial bus 8 through the IEEE 1394 ASYNC block. The packet is input to the IEEE 1394 ASYNC block 7 shown in FIG. 3. The packet is temporarily stored in the buffer memory 9 and then read by the controller 5.

The controller 5 analyzes the received command and checks signals that are currently being output to a designated plug (in this case, the sub-unit plug P0). In other words, the controller 5 checks information of signals that are currently being output with the descriptor stored in the memory 6. As exemplified in FIGS. 6A and 6B, the information describes the number of entries of objects for each plug. Thus, the controller 5 reads information of the plug P0, creates a response with the structure shown in FIG. 9, and sends the response back to the relevant unit.

However, the content of the response depends on the size of the buffer memory 9 of the IEEE 1394 ASYNC block 7 and the full length of tuner_object_selection_specification in the response. When the size of one tuner_object_selection_specification is 30 bytes and four objects are currently being output to the plug P0, the total amount of data of the response becomes 120 bytes.

Figures 11, 12:
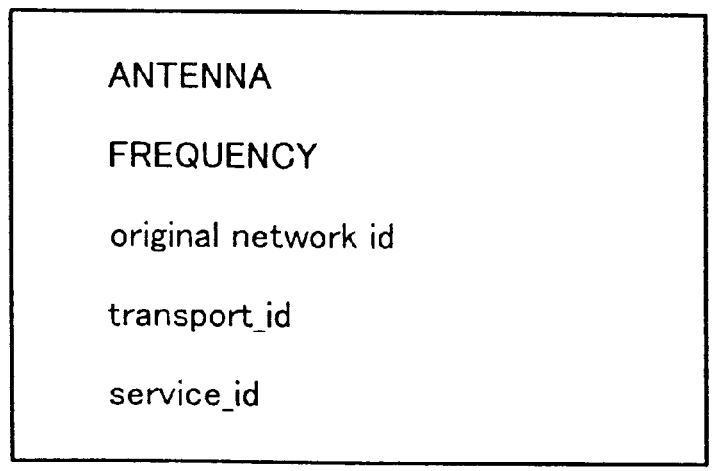
FIG. 11 is a schematic diagram showing an example of the structure of a response to the DIRECT SELECT OBJECT status command in the case that the capacity of a buffer is sufficient.
FIG. 12 is a schematic diagram showing an example of the content of information of selection_specification.

In this case, when the size of the transmission buffer of the buffer memory 9 is sufficient, the controller sends a response as shown in FIG. 11 back to the relevant unit. In this case, operand [0] is stable. With operand [3] to [x], information of four selection_specification [0] to [4] is sent back to the relevant unit. FIG. 12 shows an example of the content of each selection_specification.

On the other hand, when the size of the transmission buffer of the buffer memory 9 is for example 100 bytes, information of four objects cannot be sent back to the relevant unit. Thus, the controller sends a response as shown in FIG. 13 back to the relevant unit. In this case, operand [1] is incomplete. The value of number_of_object_selection_specification of operand [2] is the number of objects (=3) that can be sent back rather than the number of objects that are currently being output from the plug P0. With operand [3], information of three selection_specification [0] to [2] is sent back to the relevant unit.

An ASYNC packet containing the response is received by the command transmitter unit through the IEEE 1394 serial bus 8 (at step S2). The response is sent to the controller through the IEEE 1394 ASYNC block of the command transmitter unit. The controller references the status field of the response (at step S3).

When the status field is stable, as shown in FIG. 11, the response contains information of all objects. Thus, the command transmitter unit completes the process.

On the other hand, when the status field is incomplete, the response contains information of objects that can be sent back as shown in FIG. 13. Thus, information of signals that are currently being output is read from the descriptor stored in the memory 6. In the following description, a process for a packet transmitted between a command transmitter unit and a command receiver unit (the DVCR shown in FIG. 3) is omitted.

The command transmitter unit sends a command for reading a plug list of the descriptor (at step S4). The controller 5 of the command receiver unit reads the plug list as shown in FIGS. 6A and 6B from the descriptor stored in the memory 6 and sends the plug list as a response to the command transmitter unit. The command transmitter unit checks list_id=xx of plug 0 from the plug list in the response (at step S5). In this case, it is assumed that xx=0101.

Next, the command transmitter unit transmits a command for checking the number of entries of objects in the plug list of list_id=xx (in this case, xx=0101) to the command receiver unit. The command transmitter unit determines the number n of entries of objects corresponding to the response (at step S6). In this case, it is assumed that n=4.

At step S7, the command transmitter unit initially sets k=0 and sends a command for reading an object of a k-th entry of a plug list_id=xx of the descriptor to the command receiver unit. Thereafter, the command transmitter unit collects information of the object of the k-th entry corresponding to the response. After the command transmitter unit has collected the information for n entries, it completes the process (from steps S8 to S10).

Next, a command and a responses at step S9 will be described.

FIG. 14 shows an example of the structure of a command (READ DESCRIPTOR, list_id=xx, entry=k) for reading an object of a k-th entry of a flag list_id=xx of the descriptor. data_length=0 of operand [5] represents that the command transmitter unit requires to read all objects with an entry number k.

FIG. 15 shows an example of the structure of a response to the command shown in FIG. 14. data_length=yy of operand [5] represents the length of data sent with the response. entry_length of operand [8] represents the length of the object with the entry number k. When the size of the transmission buffer in the buffer memory 9 of the IEEE 1394 ASYNC block 7 shown in FIG. 3 is 100 bytes and the entry length is 30 bytes, information of one entry can be sent with one response. Thus, with yy=30 and zz=30, 30 bytes are read from offset address 0000 designated by operands [6] and [7] and sent. If the size of the transmission buffer of the buffer memory 9 is smaller than 30 bytes, (for example, the size is 10 bytes), with yy=10 and zz=30, the offset address is shifted by 10 bytes and sent as three responses.

Thus, with READ DESCRIPTOR command, when the command receiver unit cannot send to the command transmitter unit a response with information required by the command transmitter unit, the command receiver unit sends information of the maximum bytes that the command receiver unit can handle back to the command transmitter unit. In addition, since the command transmitter unit can freely designate an address and data length, it can send large amount of data with a plurality of responses.

As described above, according to the present invention, from a unit with a limited size of a transmission buffer, a large amount of data that exceeds the buffer size can be extracted.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An electronic unit for communicating with a plurality of electronic units connected by a serial bus, comprising:

receiving means for receiving a request command by said electronic unit from one of said plurality of electronic units requesting information about said electronic unit;

storage means for storing information data about said electronic unit;

retrieving means for retrieving said information data from said storage means in response to said request command; and transmission means for transmitting said information data from said electronic unit to said one of said plurality of electronic units issuing said request command via said serial bus;

said storage means having a hierarchical data structure comprising:

objects containing a predetermined data indicative of a particular subunit available at said electronic unit, at least one of said objects being retrieved in response to said request command;

a list containing information concerning each of said objects corresponding to said electronic unit and being in a layer higher than said object in said hierarchical structure, and a descriptor containing information concerning said list and other descriptive information regarding said electronic unit and being in a layer higher than said list in said hierarchial structure.

2. The electronic unit according to claim 1 further comprising a tuner for receiving data, and wherein said objects store said data received by said tuner.

3. The electronic unit according to claim 2 further comprising a logical plug for outputting data received by said tuner, and wherein said storage means stores information concerning said data output from said logical plug as an object.

4. The electronic unit according to claim 1, wherein said object is in one of two description formats, one of which is reference type format and the other of which is detailed type format, said detailed type format being more detailed than said reference type format.

5. A method for communicating between an electronic unit and one of a plurality of electronic units via a serial bus, comprising steps of:

requesting information of said electronic unit from one of said plurality of electronic units by way of a request command;

retrieving information data stored in a storing means of said electronic unit in response to said request command; and transmitting said information data from said electronic unit to said one of said plurality of electronic units issuing said request command via said serial bus; wherein said information data stored in said storing means has a hierarchical data structure comprising:

objects containing predetermined data indicative of a particular subunit available at said electronic unit, at least one of said objects being retrieved in response to said request command;

a list containing information concerning each of said objects in said list corresponding to said electronic unit and being in a layer higher than said objects in said hierarchical data structure; and a descriptor containing information concerning said list and other descriptive information regarding said electronic unit and being higher than said list in said hierarchical data structure.

6. An electronic unit for communicating with a plurality of electronic units connected by a serial bus comprising:

receiving means for receiving a request command by said electronic unit from one of said plurality of electronic units requesting information about said electronic unit;

storage means for storing information data about said electronic unit;

retrieving means for retrieving said information data from said storage means in response to said request command; and transmission means for transmitting said information data from said electronic unit to said one of said plurality of electronic units issuing said request command via said serial bus;

said storage means having a hierarchical data structure comprising:

objects containing a predetermined data, each defining at least logical input and output plugs for particular information received by said electronic unit, at least one of said objects being retrieved in response to said request command;

a list containing summary information regarding each of said objects corresponding to said electronic unit and being in a layer higher than said object layer in said hierarchical structure; and a descriptor containing information concerning said list and other descriptive information regarding said electronic unit and further including an indication of objects that are currently being output from said electronic unit, said descriptor being in a layer higher than said list in said hierarchical data structure.

7. The electronic unit according to claim 6 further comprising a tuner for receiving data, and wherein said objects store said data received by said tuner.

8. The electronic unit according to claim 7 further comprising a logical plug for outputting data received by said tuner, and wherein said storage means stores information concerning said data output from said logical plug.

9. The electronic unit according to claim 6, wherein said object is in one of two description formats, one of which is reference type format and the other of which is detailed type format, said detailed type format being more detailed than said reference type format.

10. A method for communicating between an electronic unit and one of a plurality of electronic units via a serial bus, comprising the steps of:

requesting information of said electronic unit from one of said plurality of electronic units by way of a request command;

retrieving information data stored in a storing means of said electronic unit in response to said request command; and transmitting said information data from said electronic unit to said one of said plurality of electronic units issuing said request command via said serial bus, wherein said information data stored in said storing means has a hierarchical data structure comprising:

objects containing predetermined data, each object defining at least logical input and output plugs for particular information received by said electronic unit, at least one of said objects being retrieved in response to said request command;

a list containing summary information regarding each of said objects corresponding to said electronic unit in said list and being in a layer higher than said object layer in said hierarchical data structure; and a descriptor containing information concerning said list and other descriptive information regarding said electronic unit and further including an indication of objects that are currently being output from said electronic unit, said descriptor being in a layer higher than said list in a hierarchical data structure.

\* \* \* \* \*